United States Patent
Lindholm Jensen et al.

(10) Patent No.: US 6,676,047 B1
(45) Date of Patent: Jan. 13, 2004

(54) DOUBLE SEALING VALVE

(75) Inventors: Karl-Age Lindholm Jensen, Odense S.O. (DK); Per Schneidereit, Vamdrup (DK)

(73) Assignee: Alfa Laval A/S, Kolding (DK)

(*) Notice: Subject to any disclaimer, the term of this patent is extended or adjusted under 35 U.S.C. 154(b) by 0 days.

(21) Appl. No.: 10/019,420

(22) PCT Filed: Jun. 30, 2000

(86) PCT No.: PCT/EP00/06112
§ 371 (c)(1),
(2), (4) Date: Mar. 25, 2002

(87) PCT Pub. No.: WO01/02763
PCT Pub. Date: Jan. 11, 2001

(30) Foreign Application Priority Data

Jul. 2, 1999 (WO) .............................. PCT/EP99/04622

(51) Int. Cl.⁷ ................................................ B05B 1/00
(52) U.S. Cl. ..................... 239/596; 239/494; 239/496; 239/524; 239/574; 239/600; 137/240; 137/614.18
(58) Field of Search .................... 239/104, 120, 239/390, 474, 494, 495, 496, 497, 548, 552, 554, 504, 522, 524, 569, 574, 600, 602, DIG. 19; 137/240, 614.17, 614.18, 614.19; 134/102.1, 171, 166 C, 166 R

(56) References Cited

U.S. PATENT DOCUMENTS

| | | | |
|---|---|---|---|
| 4,460,014 A | * 7/1984 | Mases et al. .......... | 137/614.18 |
| 4,522,223 A | * 6/1985 | Balsys et al. ............... | 137/240 |
| 4,531,677 A | * 7/1985 | Suzuki et al. ............... | 239/524 |
| 4,605,035 A | 8/1986 | Rasmussen | |
| 5,381,959 A | * 1/1995 | Malkin ...................... | 239/524 |
| 5,575,305 A | * 11/1996 | Mieth ......................... | 137/240 |

FOREIGN PATENT DOCUMENTS

| | | |
|---|---|---|
| DE | 93 20 801 U | 2/1995 |
| EP | 0 760 447 A | 3/1997 |
| EP | 0 819 876 A | 1/1998 |
| WO | 97 22821 A | 6/1997 |

\* cited by examiner

Primary Examiner—Steven J. Ganey
(74) Attorney, Agent, or Firm—Michael J. Striker

(57) ABSTRACT

Double sealed valve comprising: a valve seat in a communicating passage formed between an upper passage and a lower passage; a first vertical valve stem and a second vertical valve stem, which is hollow, slidably surrounding that first valve stem; said first stem having a first valve plug; said second stem having a second valve plug and a valve drive mechanism connected to said stems, between the first vertical valve stem (8) and the second valve stem (10) a passage for cleaning fluid is defined, being sealed towards the valve drive mechanism and having an outlet opening towards an annular space between the first and second valve plug being wherein the outlet opening of the passage is formed by a spray disc (23) having jet openings with an outletdirection causing a spiral flow in the annular space for cleaning the annular space (24).

9 Claims, 4 Drawing Sheets

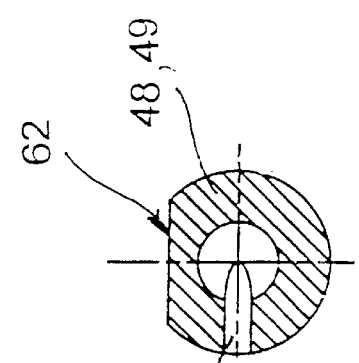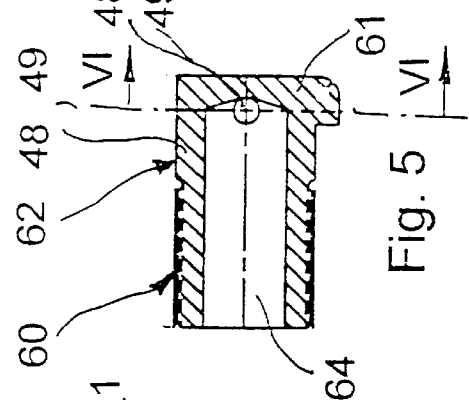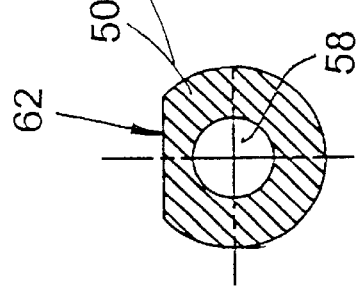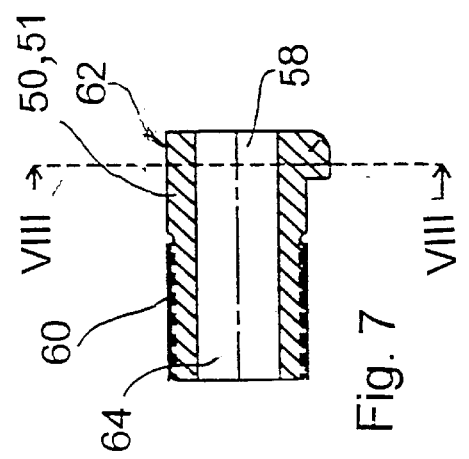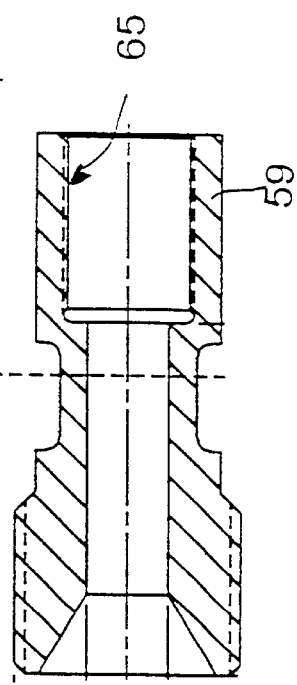

DOUBLE SEALING VALVE

DESCRIPTION

Figure 1:
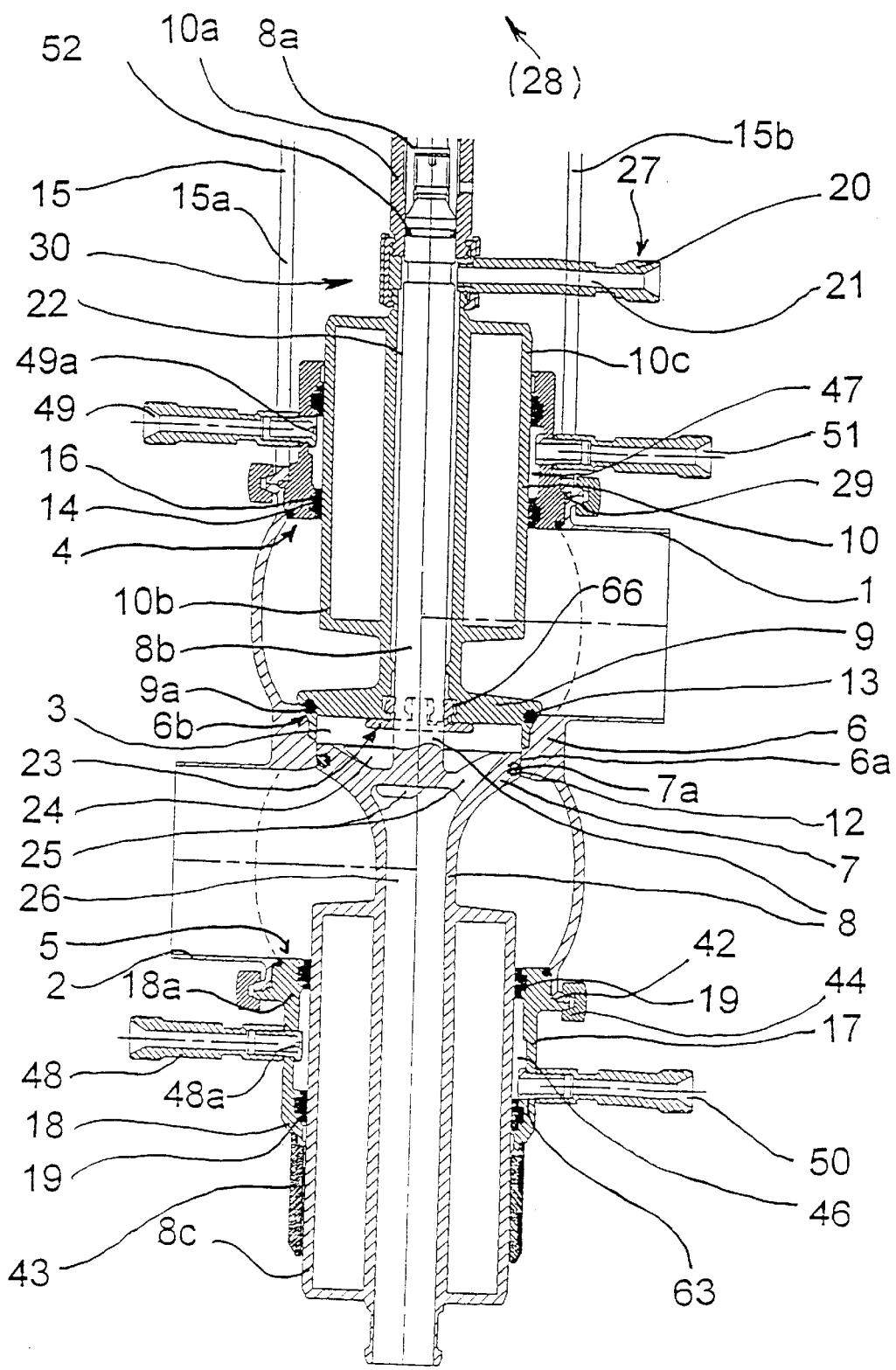

The present invention relates to a double sealed valve comprising: a valve seat in a communicating passage formed between an upper passage and a lower passage;

a first vertical valve stem and a second vertical valve stem, which is hollow, slidably surrounding that first valve stem;

said first stem having a first valve plug;

said second stem having a second valve plug and a valve drive mechanism connected to said stems.

Such a valve is known by EP 0 819 876 A3. These valves are mainly used in plants producing food stuff.

For cleaning and maintenance of the valve, the upper and lower passage can easily be separated by opening a clamp ring joining and fixing two adjacent flanges of the upper and lower passage. The connecting flanges are both bearing a recess, wherein the valve seat is held. The remaining upper and lower flanges of the upper and lower passage are designed in the same manner and an upper and lower sealing arrangement are directly clamped to the upper and lower flange by said clamp rings.

Further there is provided a valve drive mechanism, to actuate the stems. This valve drive mechanism is to be fixed also to the upper or lower passage which altogether form the double sealed valve. The valve drive mechanism is held by a yoke, which is bearing also a flange, being clamped by the clamp ring to the flange of the upper passage.

The cleaning fluid is fed through a supply opening to two passages namely to a first passage being an annular space between the first and second vertical valve stem and to a second passage being a axial bore in the first valve stem. The flow of the cleaning fluid leaving the outlet opening of the first passage into the annular space between the first and second valve plug is directed in axial direction whereas the flow of cleaning fluid of the second passage is directed partly horizontal when leaving its outlet opening. Both flows are interfering which each other giving a poor cleaning effect in the annular space between the valve plugs. The provision of two passages for feeding the cleaning fluid makes the design of the valve more complicated and expensive.

In EP 0 760 447 A 1 there is disclosed an automated pipe connection with caps for preventing intrusion of sundry bacteria into couplers for performing washing and/or sterilization operation. Inside the upper valve stem the washing water is fed via a hose and sprayed out through spraying means for example making use of small holes bored in tangential directions to spray each fluid in the form of a swirl to wash the seal of the upper and lower valve elements in the cleaning chamber. The only passage for cleaning fluid is shown as an axial bore of the upper valve stem. There are no two telescopically arranged valve stems but the valve stems are actuated from opposite sides. Therefore there is also no passage between two telescopically arranged valve stems. It is not disclosed how the cleaning fluid is fed to the bore in the upper valve stem.

The U.S. Pat. No. 4,605,035 describes a double seat valve including a valve housing and two closure members movable in the housing coaxially and relative to each other between an open and closed position. The top and/or bottom opening are sealed by a sealing arrangement, formed as a sleeve with an annular passage for cleaning fluid, whereby the annular passage is provided with a supply fitting having a supply opening. The disadvantage of this arrangement is, that the cleaning fluid flows from this supply opening on a direct path to a discharge opening giving insufficient cleaning effect at dead ends.

In food-technology or other sanetary aseptic-technologies, it is of great importance, that all the parts of the valve may be cleaned in place (CIP). But in certain intervals the valves have to be taken apart to allow thorough cleaning. All ports for cleaning fluid and passages for the cleaning fluid within the valve make the valve more complicated and make it more difficult to take it apart.

There is the need to enlarge the cleaning intervals by improving the cleaning efficiency of the fed cleaning fluid. But increasing the flow of cleaning fluid causes undesirable additional costs. There is also the need for cost reduction when using such equipment. These objects are in part contradictionary. Anyhow it is an object of the invention to achieve an external CIP-(cleaning in place)-system that needs as little as possible of CIP-liquid and time for sufficient cleaning of the leakage chamber and stems.

An further object of the invention therefore is to allow easier mounting and demounting of the valve to reduce the shut down time of the plant.

To solve this object a double sealed valve being subject of the invention having between the first vertical valve stem and the second valve stem a passage for cleaning fluid is defined, being sealed towards the valve drive mechanism and having an outlet opening towards an annular space between the first and second valve plug is proposed, wherein the outlet opening of the passage is formed by a spray disc having jet openings with an outletdirection which is horizontal and inclined with respect to a radial direction of the valve stem causing a helical flow in the annular space for cleaning the annular space. Surprisingly it has been found that the cleaning efficiency is better when the jet of the cleaning fluid hits substantially horizontal the surface under a flat angle causing a helical flow than hitting it rectangular and flowing from this point radially. That means the cleaning fluid is directed by a spirally arranged groove to form a jet which hits the wall with a velocity vector component in circumferential direction and flowing then influenced by gravity and pressure difference in helical like manner along the wall of the annular space.

In a preferred embodiment, the spray disc is mounted by means of a snap-lock to the hollow second valve stem being slidingly protruded by the first valve stem. This allows to mount the spray disc easily thereby reducing shut down time for cleaning. The disc can be easily pressed into the annular groove formed into second valve plug.

In another preferred embodiment the snap lock fits in a groove having the same dimensions as for receiving a sealing ring. In older valves without CIP cleaning in this groove a sealing ring is mounted. The valve can easily be upgraded by providing CIP cleaning facilities because the snap lock fits in a groove having the same dimensions as for receiving a sealing ring.

The costs are advantageously reduced if the spray disc is formed from plastic, preferably by injection moulding. In the spray disc nozzles may be formed with spiral like groves causing a helical flow cleaning the surfaces in the leakage chamber by means of the formed jets.

In a preferred embodiment the second vertical hollow valve stem is divided in two parts connected by a coupling, bearing a port for a cleaning fluid. The valve drive mechanism can be easily disassembled, by disconnecting the valve stems. At the same time also the feed for the CIP-liquid is disconnected.

In another preferred embodiment the coupling consists of axially split bridging parts which protrudes into an undercut or groove of the hollow valve stem, and wherein the bridging part is being held by an unsplit sleeve. By this design, the valve stems can easily be connected without needing special tools.

In an advantageous embodiment the port for cleaning fluid serves two functions. It not only feeds the CIP-liquid, but it also locks the parts of the coupling in that the sleeve and the split bridging part are locked by a port for cleaning fluid protruding the sleeve and one part of the split bridging parts.

Any leakage of the coupling can be prevented, if the parts of the hollow stem are additionally bridged by a sealing pipe member.

The object of the invention is also solved by a valve according to the subject of the invention having the top and/or bottom opening which are sealed by a sealing arrangement, formed as a sleeve with an annular passage for cleaning fluid wherein the annualar passage is provided with a supply fitting having a supply opening whereby the supply opening is formed as a cross bore in a blind ending bore of the fitting, protruding into the annular passage whereby the cross bore has an axis being arranged substantially horizontal. This design causes a helical flow of CIP-fluid in the annular passage along the sealing surface preventing thereby impurity parts to be pressed into the sealing gap by the pressurised CIP fluid. The wear of the seals and the sealing surface is advantageously reduced thereby.

The costs are reduced if the annular passage is provided with a outlet fitting having an opening with an area which preferably exceeds the area of the supply opening, and the fitting being formed the same shape as the supply fitting but without the blind end and the cross bore.

The object of the invention is also solved by a valve according to the subject of the invention having top and/or bottom opening sealed by a sealing arrangement, formed as a sleeve with an annular passage for cleaning fluid, wherein the sealing arrangement is mounted between an upper and lower passage connecting flange and a fixing ring, which form together a fixing groove wherein a collar of the upper and lower sealing arrangement is held. This allows easier maintenance of the valve, since all sealings are more easily accessed.

The number of parts are advantageously reduced, in that the upper and lower sealing arrangement are formed identical.

Figure 2:
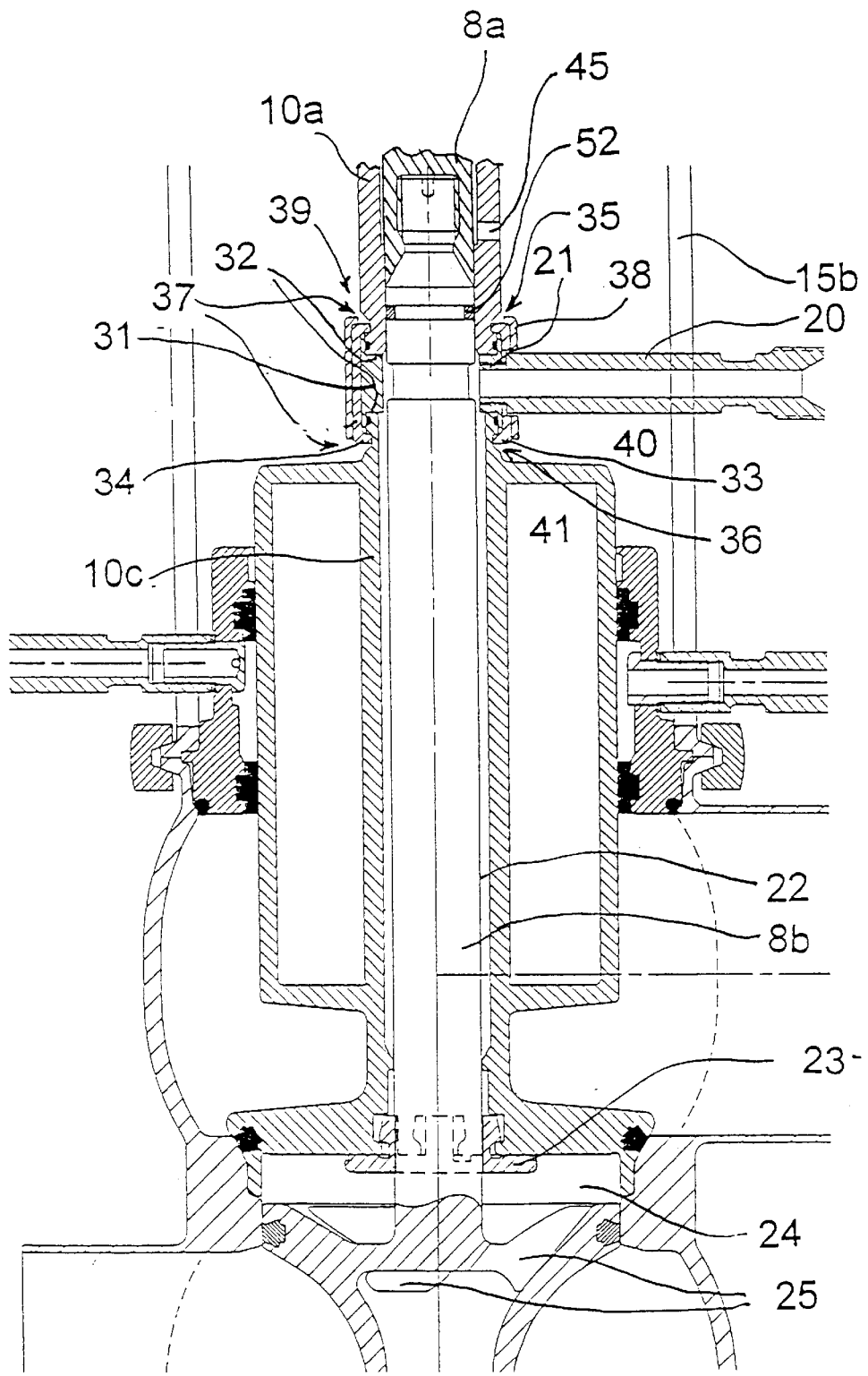
Figure 3:
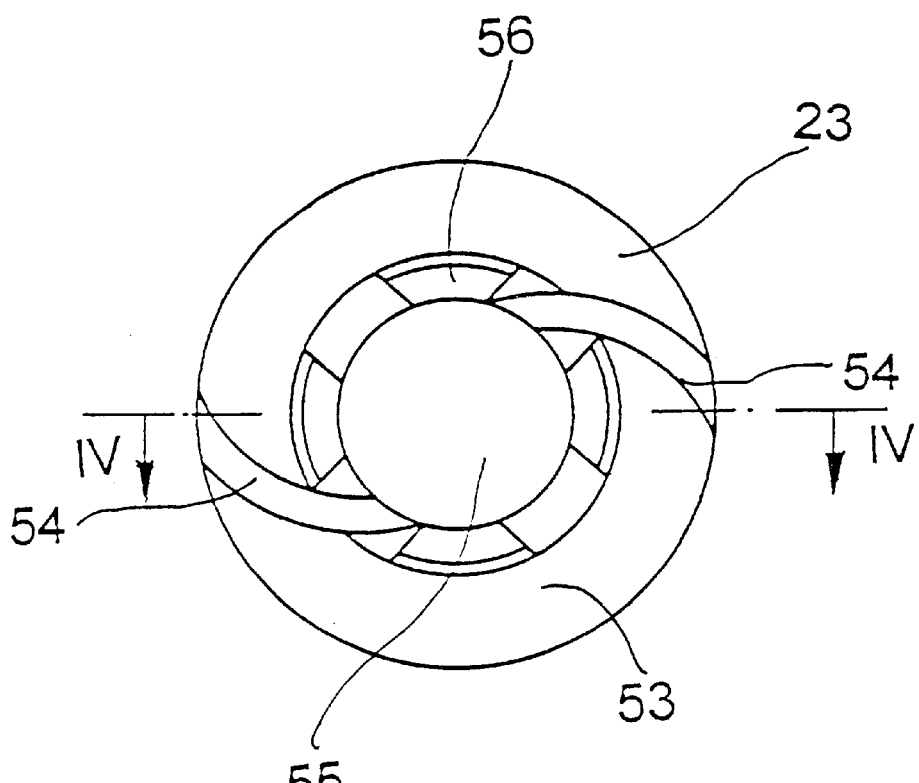
Figure 4:
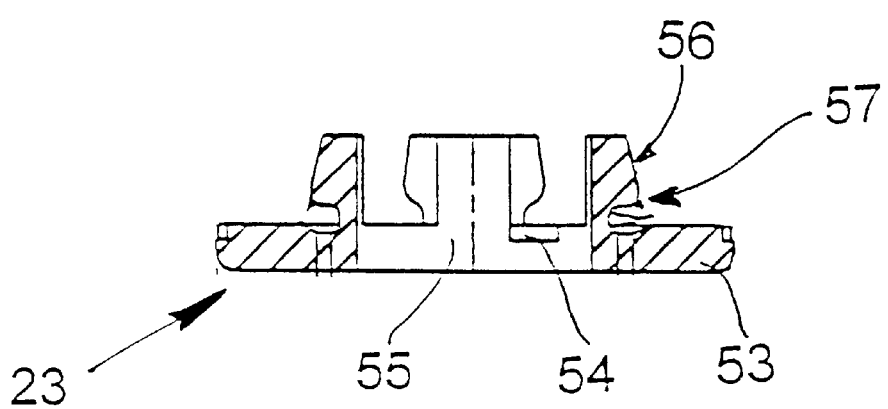

In order to illustrate the invention a preferred embodiment thereof will be described in more detail below, reference being made to the accompanying drawings in which FIG. 1 is an axial cross-section of the lower half of a double sealed valve according to the invention without the drive mechanism;

FIG. 2 is an enlarged fragmentary view in axial cross-section of the coupling with a CIP-liquid port according to the invention, FIG. 3 is a top view on the spray disc with nozzles, FIG. 4 is an axial cross-section of the spray disc along line IV—IV in FIG. 3, FIG. 5 is an axial cross-section of the inlet nozzle to the annular sleeve, FIG. 6 is a cross-section along line VI—VI in FIG. 5, FIG. 7 is an axial cross-section of the outlet nozzle of the annular sleeve, FIG. 8 is a cross-section along line VIII—VIII in FIG. 7 and FIG. 9 is an axial cross-section of the port-coupling (fitting) to the nozzles of the annular sleeve.

DETAILED DESCRIPTION OF THE EMBODIMENT

With reference to FIG. 1 the double sealed valve is circular in cross section and has a vertical axis. An upper passage 1 and a lower passage 2 extend horizontally either in parallel to or across each other. The passages 1 and 2 are interconnected by a communicating passage 3, which is defined by a valve seat 6. The upper passage 1 has a top opening 4 and a bottom opening 5 formed through its wall. The communicating passage 3 and the openings 4 and 5 are circular in cross section and coaxial with the vertical axis. One of a liquid food-medium or a washing liquid flows through each of the passages 1 and 2.

A first valve stem 8 is circular in cross section and coaxial with the vertical axis. The stem 8 extends through the openings 4 and 5 and the communicating passage 3. The stem 8 integrally includes a middle cylindrical stem part 8b, which extends through the top opening 4, and a lower cylindrical stem part 8c, which extends through the bottom opening 5. Formed between the stem parts 8b and 8c is a frist valve plug 7, which is integral and coaxial with them. The plug 7 can engage with the inner periphery of the valve seat 6. The stem 8 also includes an upper solid stem part 8a in coaxial screwed engagement with the top of the middle stem part 8b (in FIGS. 1 and 2).

A cylindrical second valve stem 10 coaxially surrounds a part of the upper stem part 8a of the first valve stem 8 and the middle stem part 8b. This stem 10 includes an upper stem part 10a and a lower stem part 10b in coaxial coupled engagement with each other. The lower stem part 10b has a second valve plug 9 formed integrally at its bottom. The stem 10 is urged downward so that the plug 9 compressively engages with an upper surface of the valve seat 6 and is positioned over the first valve plug 7. The plugs 9 and 7, the seat 6 and the bottom of the middle stem part 8b define an annular space 24, called leakage chamber.

As apparent from FIG. 1, the first valve plug 7 has an annular groove 7a formed in its outer periphery. The groove 7a holds a primary annular packing member 12 for tight but slidable contact with an inner peripheral surface 6a of the valve seat 6. The second valve plug 9 has an annular groove 9a formed in its bottom. The groove 9a holds a secondary annular packing member 13 for compressive contact with the upper conical surface 6b of the seat 6. Provided at the top opening 4 of the upper passage 1 is an annular sealing member 14, through which the outer stem part 10b of the second valve stem 10 is guided slidably. The annular sealing member 14 is clamped between the root 15a of a yoke 15 and the upper passage. The member 14 has a packing member 16 on its bottom for tight but slidable engagement with the lower stem part resp. hydraulic balancing cylinder 10b. Provided at the bottom opening 5 of the lower passage 2 is an annular sealing member 17, through which the lower stem part 8c of the first valve stem 8 is guided slidably. The annular sealing member 17 includes the thick root 18a of a sleeve 18. The root 18a has a packing member 19 on its top for tight but slidable engagement with the lower stem part 8c.

As best shown in FIG. 1 between the middle stem part 8b of the first valve stem 8 and the cylindrical inner part of the second vertical valve stem 10 an annular path 22 is formed. The hole 21 and the spray disc 23 communicate through path 22. The lower stem part 10b of the second valve stem 10 has a supply port 20 formed through its cylindrical wall, which communicates with the hole 21 of the first valve stem 8 by means of a coupling 30. Fitted to the port 20 is an outer thread 27 for connection with a hose (not shown) for supplying a washing liquid. The port 20 extends through the window 15b in the yoke 15. A washing liquid is supplied through the port 20. The liquid is introduces through the hole 21 into the annular passage 22 and discharged through the orifices or nozzles in the spray disc 23. Towards the not shown valve drive mechanism the passage 22 is sealed by the O-ring 52.

For easier mounting and demounting the second vertical valve stem 10 is separated into upper valve stem part 10a and lower valve stem part 10c. Analogue the first vertical valve stem 8 is separated into an upper part 8a and a lower part 8b. As already mentioned before, parts 8a and 8b are connected by screwing them together. The ends of the upper stem part 10a and the lower stem part 10c are stuck in pipe number 31 having a communicating hole 21 wherein port 20 is sealingly fixed. The endfaces of part 10a and 10c abut axially against a recess 32 being sealingly surrounded by the inner cylindrical surface of pipe 31. For interlocking the parts 10a and 10c two axially split bridging sections 33 and 34 are provided, which form together an annular ring with a top opening 35 and a bottom opening 36 having an diameter slightly larger than grooves 37 formed in second vertical stem part 10a and stem part 10c. To prevent the sections 33, 34 from falling apart, a bell-like sleeve 38 is provided, which covers the section 33, 34. The sleeve 38 has an upper opening 39 whose diameter is slightly larger than the diameter of the second vertical valve stem 10a. The part 20 intersects the sleeve 38, the bridging part 33 and is held in the pipe members 31. By this arrangement, cleaning fluid can be fed through port 20 by communicating hole 21 into the annular passage 22. Towards the not shown valve drive mechanism the passage 22 is sealed by the O-ring 52. If 52 is failing the leakage hole 45 secures that no CIP-liquids enter the actuator or air from actuator into leakage chamber if failure in actuator.

The coupling 30 is mounted as follows: first the end faces of valve stem 10a and 10c are stuck into pipe member 31. Than the bridging parts 33 and 34 are attached from the sides and secured by sliding the sleeve 38 over the top until the port 20 can be inserted through side opening 40 of sleeve 38, passing opening 41 of bridging part 33 to fit into communicating hole 21 of pipe member 31.

The annular passage 22 is defined between the outer periphery of the middle stem part 8b of the first valve stem 8 and the inner periphery of the lower stem part 10b of the second valve stem 10. The washing liquid supplied through the port 20 is introduced into the annular passage 22 and discharged at the bottom of the middle stem part 8b through the spray disc 23.

For example, the washing liquid supplied through the port 20 flows through the communicating hole 21 of into the annular passage 22. The liquid in the annular passage 22 is ejected through the bottom orifices of spray disc 23 into the annular space 24. The ejected liquid washes the inside of the space 24, which includes the inner periphery of the valve seat 6 and the inner surfaces of the valve plugs 7 and 9. Then, the liquid is discharged through the holes 25 formed in the first valve stem 8 and through the bore 26 in the lower stem part 8c to the outside.

Thus, by supplying a washing liquid through the supply port 20, it is possible to wash the inner periphery of the valve seat 6 and the inner surfaces of the valve plugs 7 and 9. At the same time, it is possible to automatically and completely wash the clearance for sliding between the outer periphery of the middle stem part 8b of the first valve stem 8 and the inner periphery of the lower stem part 10b of the second valve stem 10.

With reference to FIG. 1, an annular passage 46 is defined between the outer periphery of the lower stem part 8c of the first valve stem 8 which extends downward from the lower passage 2 and the inner periphery of the annular member 17, which guides this stem part. Another annular passage 47 is defined between the outer periphery of the lower stem part 10b of the second valve stem 10 which extends upward from the upper passage 1 and the inner periphery of the annular member 14, which guides this stem part. The passages 46 and 47 have lengths which are longer than the maximum strokes of the stems 8 and 10 respectively. The passages 46 and 47 have supply ports 48 and 49 formed in their respective tops, and discharge ports 50 and 51 formed in their respective tops. The supply ports 48 and 49 are smaller in diameter than the discharge ports 50 and 51 respectively Fitted to the supply ports 48 and 49 are nozzles 48a and 49a respectively for supplying a washing liquid in tangential direction to induce a helical flow for improved cleaning. The discharge ports 50 and 51 have a much bigger diameter to avoid any risk of pressure build up for discharging the liquid.

The top opening 4 and the bottom opening 5 of the upper passage 1 and lower passage 2 bear a connecting flange 42. The flange 42 and the clamp ring 44 form the fixing of the annular collar 29 of the sealing member 14, 18 is held. As easily can be seen, the sealing member 14 is a separate part from the yoke 15.

As stated above, the annular passages 46 and 47 are longer than the maximum strokes of the valve stems 8 and 10 respectively. Thus, since the overall strokes of the stems 8 and 10 are covered by the annular passages 46 and 47 inside the annular members 17 and 14 respectively, it is possible to securely prevent the exposed portions of the stems 8 and 10 from entering uncleaned the passages 2 and 1 respectively. In addition, the portions of the stems 8 and 10 which have been exposed to the air in any valve position or state can be washed immediately by supplying the annular passages 46 and 47 with a washing liquid through the ports 48 and 49 respectively. Instead of CIP liquid also a steam barrier is possible. It is therefore possible to cope quickly and adequately with pollution. Also a steam barrier is possible if desired.

In order to clean the lower stem part 8c of the first valve stem 8 which extends downward from the lower passage 2, as shown in FIG. 1, a pressurized washing liquid is supplied through the port 48. The liquid sufficiently washes the outer periphery of the stem part 8c while flowing through the annular passage 46. Then, the liquid is discharged through the port 50. The liquid flowing through the passage 46 is formed into a helical flow through the nozzles 48a. The spiral flow can effectively wash the outer periphery of the stem part 8c. The helical flow prevents wear on the surface of the gaskets 19 and 16 as the liquid is flowing along the surface instead being directed rectangular against the surface. By this also a longer lifetime of the gaskets is achieved. Likewise, to wash the second valve stem 10, a pressurised washing liquid is supplied through the port 49. The liquid sufficiently washes the outer periphery of the lower stem part 10b while flowing through the annular passage 47. Then, the liquid is discharged through the port 51. The liquid is formed into a helical flow through nozzle 49a. The spiral flow can effectively wash the outer periphery of the stem part 10b. Since the discharge ports 50 and 51 are larger in diameter than the supply ports 48 and 49 respectively, it is possible to effectively discharge the liquid from the annular passages 46 and 47 to the discharge ports 50 and 51 respectively.

The arrangement of the spray disc 23 and the separated structure of sealing sleeve 14 from yoke 15 according to the invention as well as the coupling for CIP-liquid feed to the valve stems can be used of course also with a valve wherein the plugs open downwards. The same applies to a design wherein it is not made use of the hydraulic balances 10b and 8c.

In FIG. 3 and 4 the spraydisc is shown. It consists of a plate 53 with one or more, here two, spirally formed grooves 54. The plate 53 has a centrally arranged orifice 55 for allowing the valve stem 8 to pass. Surrounding the orifice 55 four sectors of a hublike cylindrical extension 56 are attached to the plate 53 bearing noses 57 to snap into a corresponding groove formed 66 (FIG. 1) into the second valve plug 9 to lock the plate in its position. The cleaning fluid flows down the annular passage 22 and then into the horizontally arranged groove 54. Since the groove 54 is formed spirally, the outlet direction of the spraydisc 23 is not radially but tangentially to a circle drawn around the centre of the valve stem.

FIGS. 5 and 6 are showing the inlet nozzles 48 and 49 to the annular sleeves 46 and 47 (FIG. 1). They are formed as short pipes provided with a outer threading 60 on one end for connection with a connecting fitting 59 (FIG. 9). The other end is closed and has a flange 61 being flatted forming a surface 62 to abut against a collar 63 (FIG. 1) provided in the annular sleeves 46, 47 (FIG. 1) for fixing its angular position. Parallel to the flattened surface 62 a supply opening 48a, 49a is formed into the fitting to communicate with the inner space 64. By this arrangement the cleaning fluid is led tangentially into the annular sleeve causing a helical flow to the outlet fittings 50, 51 (FIGS. 7 and 8). These fittings are formed substantially identical to the fittings 48 and 49 but without the closed end. The outlet opening 58 is much larger than the area of the supply opening 48a, 49a.

FIG. 9 shows the connecting fitting 59. It is formed as a pipe with an inner thread 65 to be screwed on the outer thread 60 of fittings 48, 49, 50, 51.

Reference List 1 upper passage
2 lower passage
3 communicating passage
4 top opening
5 bottom opening
6 seat
7 first valve plug
7a annular groove
8 first vertical valve stem
8a solid stem part
8b lower solid valve stem part
8c cylindrical stem part
9 second valve plug
9a annular groove
10 second vertical valve stem
10a upper stem part
10b lower stem part
10c outer stem part
12 annular packing member
14 annular sealing member
15 yoke
15a root
15b window
16 packing member
17 annular sealing member
18 sleeve
18a roote
19 annular packing member
20 port
21 communicating hole
22 annular passage
23 spray disc
24 annular space
25 holes
26 bore
27 outer thread
28 valve drive mechanism
29 colar
30 coupling
31 pipe member
32 recess
33 bridging part
34 bridging part
35 top opening
36 bottom opening
37 grooves
38 sleeve
39 upper opening
40 side opening
41 opening
42 connecting flange
43 protection cover
44 clamp ring
45 leakage indication hole
46 annular passage
47 annular passage
48 port, supply fitting
48a nozzle, supply opening
49 port, supply fitting
49a nozzle, supply opening
50 discharge port, outlet fitting
50a discharge nozzle, opening
51 discharge port, outlet fitting
51a discharge nozzle, opening
52 O-ring
53 plate
54 groove
55 orifice
56 extension
57 nose
58 opening
59 connecting fitting
60 outer threading
61 flange
62 flat surface
63 collar
64 inner space
65 inner thread
66 groove

What is claimed is:

1. Double sealed valve comprising: a valve seat in a communicating passage formed between an upper passage and a lower passage;

a first vertical valve stem and a second vertical valve stem, which is hollow, slidably surrounding that first valve stem;

said first stem having a first valve plug;

said second stem having a second valve plug and a valve drive mechanism connected to said stems, between the first vertical valve stem (8) and the second valve stem (10) a passage for cleaning fluid is defined, being sealed towards the valve drive mechanism and having an outlet opening towards an annular space between the first and second valve plug, wherein the outlet opening of the passage is formed by a spray disc (23) having jet openings with an outlet direction which is horizontal and inclined with respect to a radial direction of the valve stems causing a helical flow in the annular space for cleaning the annular space (24), and wherein the spray disc (23) is mounted by means of a snap-lock to the hollow second valve stem (10) being slidingly protruded by the first valve stem.

2. Double sealed valve according to claim 1, wherein the snap lock fits in a groove having the same dimensions as for receiving a sealing ring.

3. Double sealed valve according to claim 1, characterized in that, the spray disc is formed from plastic, preferably by injection moulding.

4. Double sealed valve comprising; a valve seat in a communicating passage formed between an upper passage and a lower passage;

a first vertical valve stem and a second vertical valve stem, which is hollow, slidably surrounding that first valve stem;

said first stem having a first valve plug;

said second stem having a second valve plug and a valve drive mechanism connected to said stems, the top (4) and/or bottom opening (5) are sealed by a sealing arrangement (14, 17) formed as a sleeve (18) with an annular passage (46, 47) for cleaning fluid, wherein the annular passage (46, 47) is provided with a supply fitting (48, 49) having a supply opening (48a, 49a) whereby the supply opening is formed as a cross bore in a blind ending bore of the fitting, protruding into the annular passage whereby the cross bore has an axis being arranged substantially horizontal.

5. Double sealed valve according to claim 4, wherein the annular passage (46, 47) is provided with an outlet fitting (50, 51) having an opening (58) with an area which preferably exceeds the area of the supply opening, and the fitting being formed the same shape as the supply fitting but without the blind end and the cross bore.

6. Double sealed valve comprising: a valve seat in a communicating passage formed between an upper passage and a lower passage;

a first vertical valve stem and a second vertical valve stem, which is hollow, slidably surrounding that first valve stem;

said first stem having a first valve plug;

said second stem having a second valve plug and a valve drive mechanism connected to said stems, between the first vertical valve stem (8) and the second valve stem (10) a passage for cleaning fluid is defined, being sealed towards the valve drive mechanism and having an outlet opening towards an annular space between the first and second valve plug, wherein the outlet opening of the passage is formed by a spray disc (23) having jet openings with an outlet direction which is horizontal and inclined with respect to a radial direction of the valve stems causing a helical flow in the annular space for cleaning the annular space (24), and wherein the spray disc (23) is mounted by means of a snap-lock to the hollow second valve stem (10) being slidingly protruded by the first valve stem, wherein the second vertical hollow valve stem (10) is divided in two parts (10a, 10c), connected by a coupling (30), bearing a port (20) for a cleaning fluid.

7. Double sealed valve according to claim 6, wherein the coupling (30) consists of axially split bridging parts (33, 34) which protrude into an undercut (37) of the hollow valve stem (10), and wherein the bridging parts (33, 34) are being held by an unsplit sleeve (38).

8. Double sealed valve according to claim 7, wherein, the sleeve (38) and one part (33) of the split bridging parts (33, 34) is locked by a port (20) for cleaning fluid protruding the sleeve (38) and one part (33) of the split bridging parts.

9. Double sealed valve according to claim 6, wherein, the parts of the hollow stem (10) are bridged by a sealing pipe member (31).

* * * * *